United States Patent [19]

Loth

[11] 4,154,220

[45] May 15, 1979

[54] FLAT-PLATE SOLAR COLLECTOR WITH AIR FLOWING THROUGH THE GROOVES IN A FOAM ABSORBER SURFACE

[76] Inventor: John L. Loth, P.O. Box 4094, Morgantown, W. Va. 26505

[21] Appl. No.: 779,365

[22] Filed: Mar. 21, 1977

[51] Int. Cl.² .............................................. F24J 3/02
[52] U.S. Cl. .................................................... 126/270
[58] Field of Search ................................ 126/270, 271

[56] References Cited

U.S. PATENT DOCUMENTS

| | | | |
|---|---|---|---|
| 3,866,285 | 2/1975 | Clark | 126/271 |
| 4,046,133 | 9/1977 | Cook | 126/270 |
| 4,048,981 | 9/1977 | Hobbs | 137/1 A |
| 4,062,351 | 12/1977 | Hastwell | 126/271 |
| 4,069,809 | 1/1978 | Strand | 126/270 |

*Primary Examiner*—Carroll B. Dority, Jr.
*Attorney, Agent, or Firm*—Schuyler, Birch, Swindler, McKie & Beckett

[57] ABSTRACT

This invention relates to a more cost effective construction of an air type flat-plate solar collector. More particularly the invention has reference to replacing the usual combination of insulation backing and a good thermally conducting metal black absorber surface by a single, specially grooved and blackened, foam insulation type absorber surface. The airstream flows mainly inside the grooves to minimize its contact with the transparent cover. This new configuration saves weight, materials and cost, and shows little or no loss in performance during steady state efficiency tests. Due to the low thermal capacity of the foam absorber surface the collector warms up very quickly and often the internal thermal switch will actuate the fan motor within five minutes after exposure to solar radiation. This low time lag allows it to collect more heat during a day with intermittent sunshine than a collector with identical efficiency but with a metal absorber of greater thermal capacity which takes longer to warm up.

16 Claims, 5 Drawing Figures

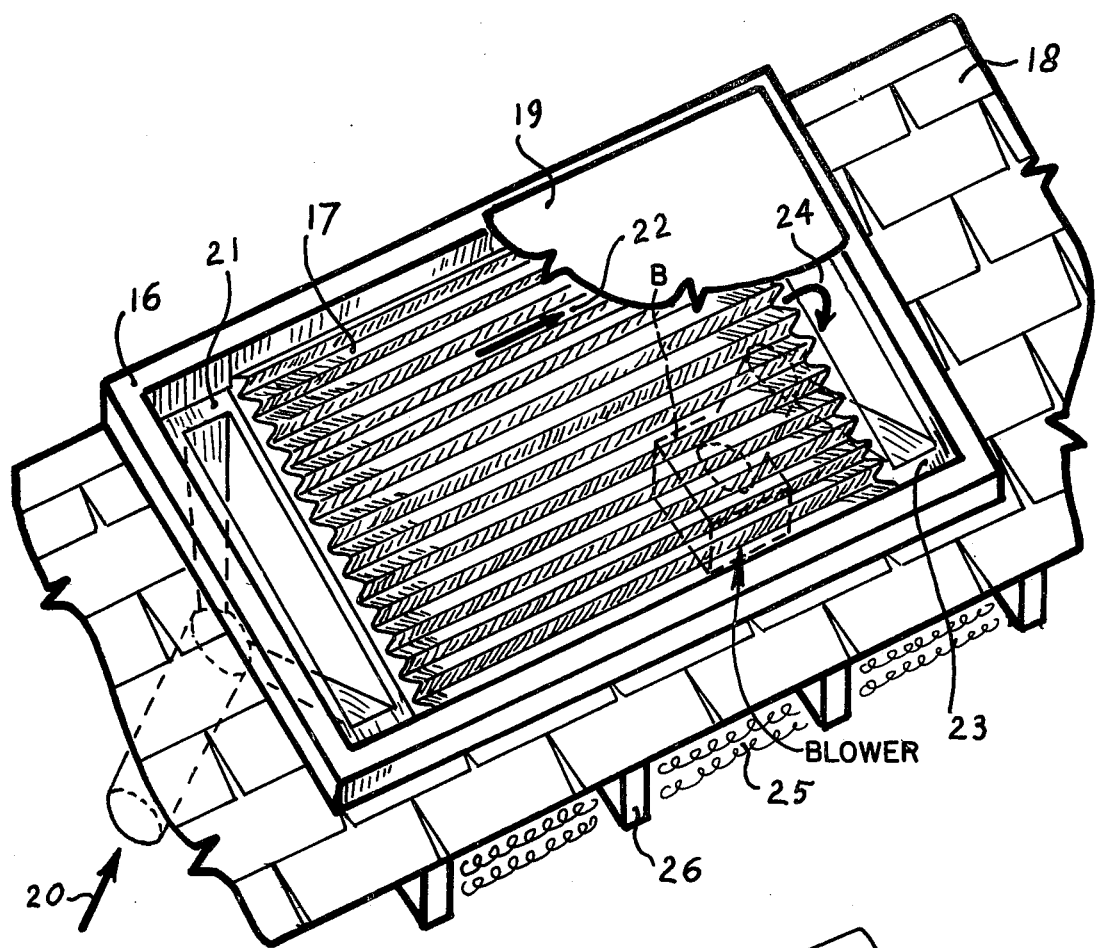
FIG. 3
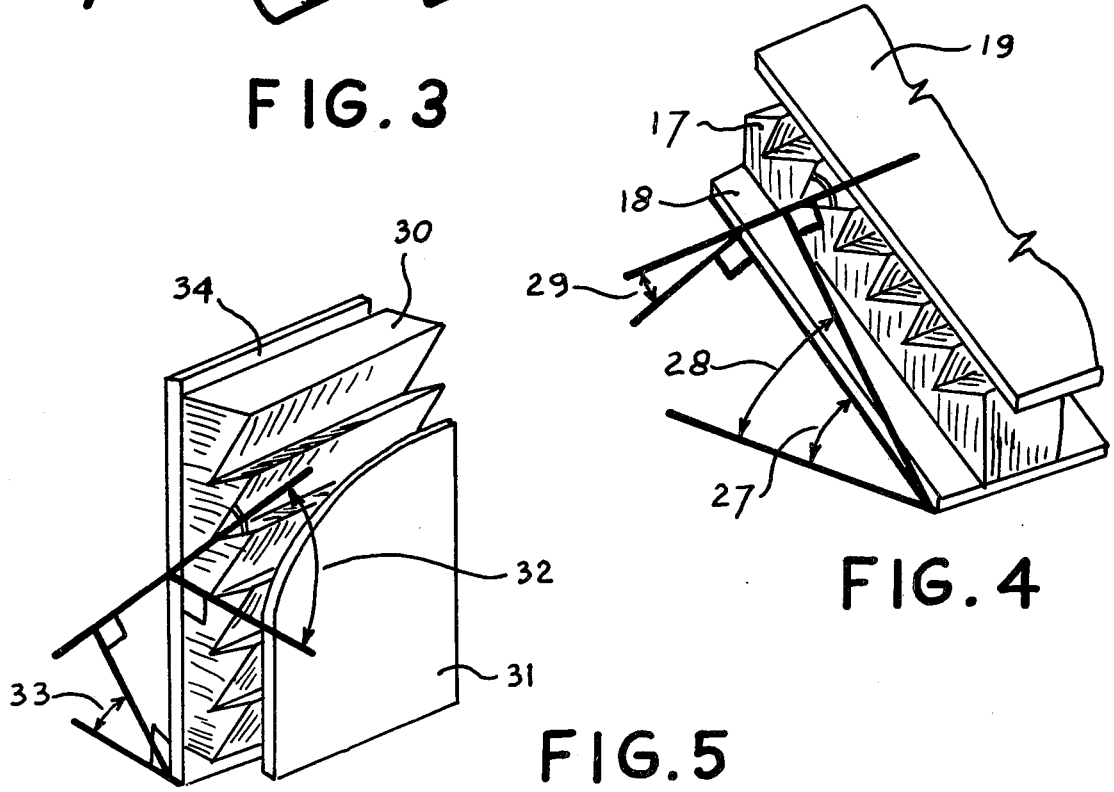
FIG. 4
FIG. 5

FLAT-PLATE SOLAR COLLECTOR WITH AIR FLOWING THROUGH THE GROOVES IN A FOAM ABSORBER SURFACE

BACKGROUND OF THE INVENTION

Flat-plate solar collectors using air to carry off the collected heat, mostly consist of four district components:

(a) one or more transparent cover sheets, (b) a blackened radiation absorber surface in the form of finned or corrugated metal sheets or multiple layers of an open lattice type material. The absorber surface must be able to transfer the collected heat to the airstream without a high temperature difference, (c) a separate thermally insulating backing to prevent heat loss to the surroundings, (d) a structurally supporting container.

SUMMARY OF THE INVENTION

This invention relates to a more cost effective configuration by replacing the materials used in (b) and (c) above by a specially grooved single slab of a foam type insulation.

This foam slab has to be matched with special deep grooves to perform the functions of the materials it replaces. The grooves are run in the East-West direction and are oriented at the optimum collector tilt angle in order to receive uniform heating by solar radiation and be uniformly cooled by the airstream. Such a configuration avoids hot spots and the need to conduct the heat absorbed from one location to another for collection by the airstream. The absence of heat transfer by conduction eliminates the need for a good thermal conducting metal absorber. The grooves are deep and expose a large heated area for heat transfer to the air. The radiation absorber area can easily be three times that of the cold transparent cover area. A foam type material is chosen for the absorber surface because it exposes numerous small air pockets, which each act like a "black hole" for incoming radiation, and increase the effective absorptivity of the surface. The associated surface roughness increases the convective heat transfer coefficient and reduces the temperature difference between the absorber surface and the airstream. The insulation capacity of the foam allows the grooved foam absorber slab to be glued directly to its supporting structure. The low thermal capacity of the foam causes the collector to warm up very quickly after exposure to solar radiation. This characteristic enables the grooved foam type collector to operate over a greater accumulated period of time during days with intermittent sunshine.

The characteristics of the foam type collector, all of which are satisfied by a product called "Foamglas" which has been tested and proved to be satisfactory, are as follows:

(a) high temperature and solar radiation tolerance (b) be relatively inexpensive (c) have good insulating properties (d) must be easily machinable in the desired grooved configuration (e) have good structural stiffness and strength, especially at the sharp peaks of the ridges (f) the grooved surface must expose numerous air pockets to give it a high effective absorptivity and more diffuse reflection characteristics. This rough absorber surface also improves the heat transfer to the air and avoids a high temperature difference between the two;

(g) must be a naturally black surface or be easily blackened.

The grooves in the foam type collector should be shaped and oriented such as to have a nearly uniform exposure from the solar radiation over most of the collector operating period. To minimize the number of shaded areas the grooves should run in the East-West direction. In this event forced convection airflow is required. For passive natural convection air flow applications the grooves will have to run in the North-South direction.

Any surface placed at an optimum tilt angle $\phi$, equal to the latitude plus ten degrees, will intercept the maximum usable solar radiation during the winter heating season. Therefore, the plane of symmetry through the bottom of any East-West running groove should be perpendicular to the optimum tilt angle $\phi$. If the collector is installed at the optimum tilt angle $\phi$ then the grooves are cut with their plane of symmetry perpendicular to the flat back side of the foam slab. However, if the collector is tilted at an angle different from the optimum such as on a low pitch roof or in a vertical installation, then the grooves must be inclined relative to the flat back side of the foam slab so that their plane of symmetry remains perpendicular to the optimum angle $\phi$ when installed.

When polyurathane foam is used, the grooves can be cut with a hot wire, but when Foamglas is used they should be cut with a shaped rotating bit in a drill press. The groove shape can vary from U to V type. However, the V type groove is recommended for greater thickness and structual strength of the ridges and for a more evenly distribution of the solar radiation over the surface. The total groove angle $\gamma$ should be chosen small in order to get:

(a) high effective solar absorptivity (b) high ratio of black absorber surface to cold transparent cover area.

If the black foam surface is a non-selective diffuse absorber with absorptivity $\alpha_d$ then the uniformly irradiated groove has an effective absorptivity as given by:

$$\alpha_{EFFECTIVE} = \alpha_d[1 + (1-\alpha_d)(1-\sin\gamma/2) + (1-\alpha_d)^2(1-\sin\gamma/2)^2 + \ldots]$$

The value of $\alpha_{EFFECTIVE}$ is as high as 0.96 for $\gamma = 30°$ and $\alpha_d = 0.85$.

If the black foam surface is a specular reflecting non-selective absorber with absorptivity $\alpha_s$ and the solar radiation entering experiences n internal specular reflections then the effective absorptivity is given by:

$$\alpha_{EFFECTIVE} = \alpha_s[1 + (1-\alpha_s) + (1-\alpha_s)^2 + \ldots (1-\alpha_s)^{m-1}]$$

The value of $\alpha_{EFFECTIVE}$ is high = 0.98 for n = 6 and $\alpha_s = 0.85$. An actual surface will have a reflection property somewhere in between diffuse and specular.

The V groove angle $\gamma$ should be as small as feasible so as to get a high ratio of hot black surface to air heat transfer area to cold cover plate area. This ratio equals: $1/\sin\gamma/2$ which is 3.86 for $\gamma = 30$ degrees. The convective heat transfer coefficient on the rough surface of the foam is about twice as high as on the smooth transparent cover surface. The combined effect of high area ratio and high heat transfer coefficient ratio causes the airstream to loose relatively little heat to the cold transparent cover surface.

The groove depth does not effect the performance of the collector greatly and should be designed to match the available fan power and groove length in use. Usually air velocities up to 2 meter per second are used. The distance between the ridges and the transparent cover should be kept at a minimum to maximize the amount of air flowing inside the grooves instead of in the space between the foam and the transparent cover. By placing the blower suction side at the air outlet of the collector a slight negative pressure can be maintained inside the collector which tends to deflect the cover downward and minimize the gap between the cover and the ridges.

BRIEF DESCRIPTION OF FIGURES

The apparatus constructed and tested in accordance with the invention is illustrated in the accompanying drawings.

If the angle which the collector makes with the horizon equals the local latitude plus about 10 degrees then the "V" grooves should be machined symmetrically as shown here.

FIG. 3 shows a typical flat plate collector installation on top of a low pitch shingled roof. Such an installation requires two holes to be cut in the roof surface for each collector unit. These holes are to pass air ducts from the attic to the collector in and outlet manifolds. An arrow shows the air flowing through the grooves in the West to East direction.

FIG. 4 shows a collector installation on a roof which makes an angle with the horizon which is significantly less than the latitude plus 10 degrees. In order to get the "V" groove centerline to be parallel to the incoming sun rays, it is necessary to make the grooves asymetric, with their ridges pointing down as shown.

FIG. 5 shows a collector installation on a vertical wall. In order to get the "V" groove centerline to be parallel to the incoming sun rays, it is necessary to make the grooves asymetric, with their ridges pointing up as shown.

DETAILED DESCRIPTION OF FIGURES

Figure 1:
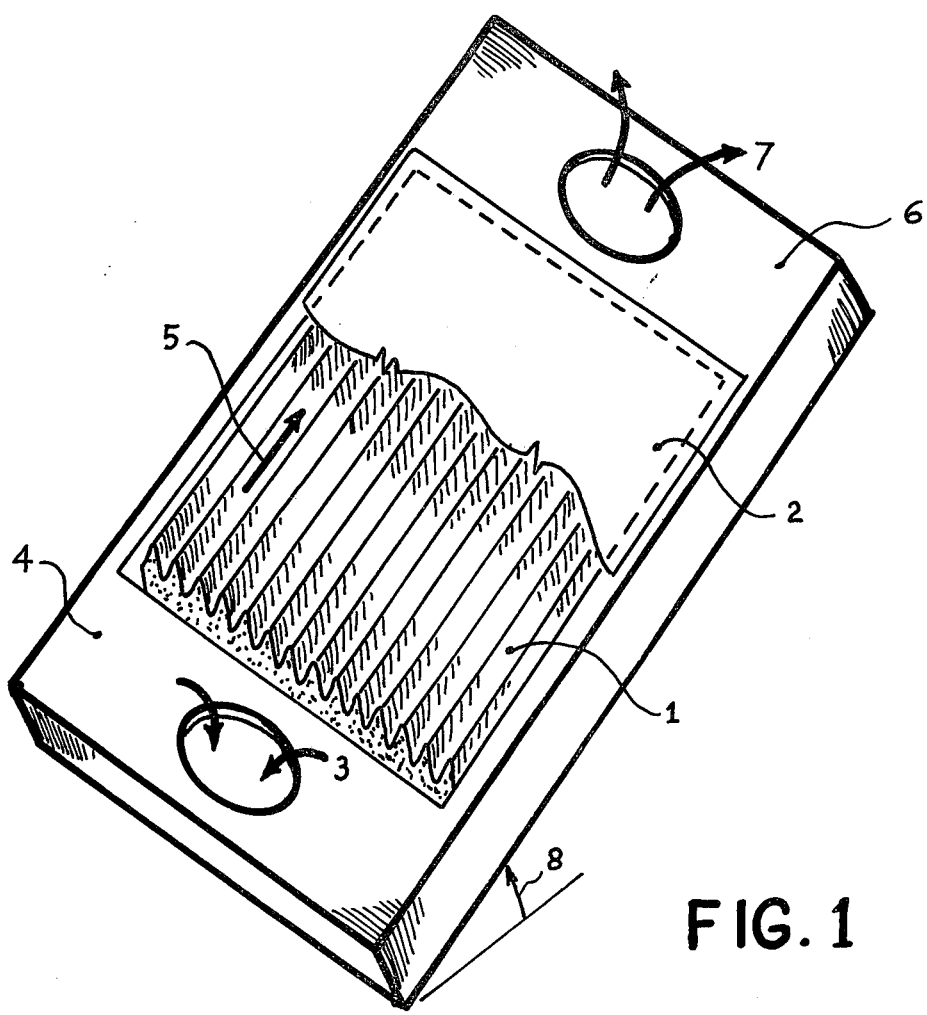
FIG. 1 shows a flat plate solar air heater with an air in and outlet manifold at each end. The solar radiation collecting area of the collector is made out of only two materials. One material is a smooth diaphanous cover which allows the solar radiation to enter and forms the upper and smallest part of the air channel wall. The other material is a rough, porous insulating foam with deep black "V" grooves cut in its upper surface and placed directly against or in close proximity to the smooth diaphanous cover. The grooves must have sufficient depth so that they can accommodate the entire airflow within the grooves without excessive friction pressure drop. The grooves must have such a sharp "V" angle that the foam "surface-to-air contact area" greatly exceeds the diaphanous "cover-to-air contact area."

FIG. 1 is a schematic of the apparatus constructed and tested to determine the efficiency of the grooved foam flat plate collector. The grooved foam slab 1 is shown with V grooves machined at $\gamma = 30°$ total angle and oriented in the North-South direction for the purpose of testing both forced and natural convection. The transparent cover 2 has been partially removed to show clearly the black painted grooves with the small exposed air pockets indicated by dots. The inlet air 3 enters at inlet plenum 4 and then passes between the foam grooves and the cover in the direction 5 to the output plenum 6. From the outlet plenum 6 it flows through the exit in direction 7. This test collector is facing south and inclined at the optimum collector tilt angle $\phi$ as indicated by 8.

Figure 2:
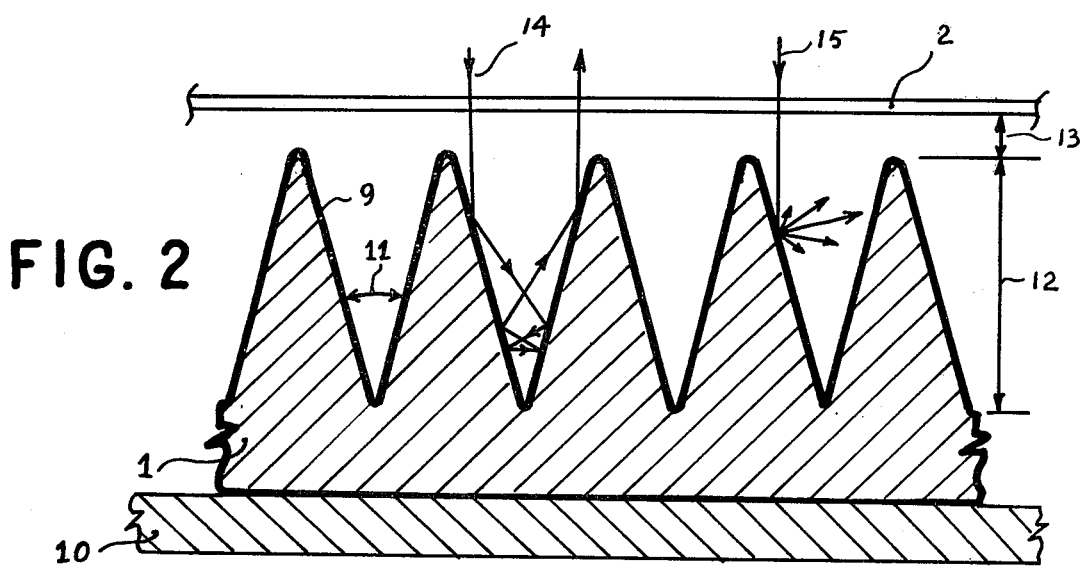
FIG. 2 shows a cross section of the diaphanous cover material in close proximity with the grooved porous black foam, which functions simultaneously as a high solar radiation absorber, a rough good heat transfer surface, a relatively large finned heat transfer area, a containing channel for the air flow, an insulation spacer between the hot "V" groove bottoms and the cold diaphanous cover and an insulation spacer between the hot "V" groove bottoms and the cold backside of the collector. Arrows show the internal light reflections for both specular and diffuse reflections. These multiple internal reflections on the black porous surface causes the sharp "V" grooves to have such a high effective radiation absorptivity.

FIG. 2 is a detailed cross section of the V grooved foam slab used in FIG. 1. The foam slab 1 provides insulation between the black absorber side 9 and the structural backing board 10. The V grooves shown are cut at an angle $\gamma$ indicated by 11. The grooves are cut to a depth 12 which is deep enough to allow sufficient air passage at a reasonable friction pressure loss. The grooved foam slab is covered by a transparent cover 2 at a minimum distance 13 from the peaks of the foam ridges. A typical specularly reflecting light ray is shown as 14. The multiple internal reflections create the high effective absorptivity of this surface. A typical diffuse reflecting light ray is shown by 15. The high value of the viewfactor between the two sides of each groove causes a high effective absorptivity for diffuse reflecting light rays.

FIG. 3 is a typical forced air roof top insulation. A frame 16 is nailed to the roof on top of the shingles. Foam slabs 17 are glued to the existing roofing with shingles 18 and have their grooves running in the East-West direction for maximum efficiency and minimum shading. The transparent cover 19 has been partially removed to better show the orientation of the grooves. The air is supplied from a duct 20 which passes from the attic through the roof to the inlet air plenum 21 and then flows through the grooves in direction 22 to the outlet plenum 23 from where it is ducted through the roof as the hot air supply 24. Additional insulation 25 can be installed between the rafters 26 on the attic side.

FIG. 4 shows a detail of the foam slab 17 used in FIG. 3. In this case the roof pitch angle 27, or the actual collector tilt angle is less than the optimum collector tilt angle $\phi$ shown by 28, which is the latitude plus 10 degrees. This requires the grooves to be machined at an oblique angle 29 relative to the perpendicular to the back of slab 17, where angle 29 is the difference between the optimum collector tilt angle 28 and the actual tilt angle 27. A segment of the roofing 18 and transparent cover 19 are also shown.

FIG. 5 is a cross section of a foam slab 30 used in a vertically mounted flat plate collector. The transparent cover 31 is shown partially removed. In this case the grooves in the foam slabs have to be machined at an oblique angle 32 relative to the perpendicular to the back of slab 30. The oblique angle 32 equals the 90 degree compliment of the optimum collector tilt angle $\phi$ as indicated by 33. The foam slab is glued to the structural backing board 34.

Having now particularly described and ascertained the nature of my said invention and in what manner the same is to be performed, I declare that what I claim is:

1. In a solar collector for transferring solar energy to air, the improvement comprising:

a black absorber for absorbing solar energy impinging thereon having a plurality of adjoining grooves, said plurality of grooves being V or U-shaped and having deeply cut sides diverging rom the bottom of the groove to substantially increase both the radiation absorptivity by generating multiple reflections and the heat transfer surface area of said black absorber, said black absorber being formed by blackened insulating foam having numerous exposed air pockets to thereby increase the surface heat transfer coefficient; and a flat smooth diaphanous surface mounted in close proximity to said plurality of grooves in said black absorber in order to force substantially all the air in said solar collector to be conveyed by said plurality of grooves.

2. The improved solar collector according to claim 1 wherein the ridges of said plurality of grooves contact said flat smooth diaphanous surface.

3. The improved solar collector according to claim 1 wherein the air outlet of said solar collector is connected to the suction side of a blower which creates a slight negative pressure inside said solar collector to deflect said diaphanous surface toward the ridges of said plurality of grooves to thereby minimize the gap between said plurality of grooves and said ridges.

4. The improved solar collector according to claim 1 wherein the heat transfer surface area of said diaphanous surface is minimized.

5. The improved solar collector according to claim 1 wherein said plurality of grooves are oriented to have a nearly uniform exposure to solar energy over most of the operating period of said solar collector.

6. The improved solar collector according to claim 5 wherein said plurality of grooves run in the East-West direction for forced air convection and their plane of symmetry through the bottom of said grooves is perpendicular to the optimum solar collector tilt angle but independent of the actual solar collector tilt angle.

7. The improved solar collector according to claim 5 wherein said plurality of grooves run in the North-South direction for natural air convection and their plane of symmetry through the bottom of said grooves is perpendicular to the optimum solar collector tilt angle but independent of the actual solar collector tilt angle.

8. The improved solar collector according to claim 1 wherein said plurality of grooves have a small included angle in order to maximize the effective absorptivity of said black absorber and to maximize the ratio of the surface area of said black absorber to the surface area of said diaphanous surface.

9. The improved solar collector according to claim 8 wherein the surface area of said black absorber is approximately three times the surface area of said diaphanous surface.

10. The improved solar collector according to claim 1 wherein said black absorber is a good insulator of low thermal capacity in order to minimize the time period required for said black absorber to reach an operating temperature after sudden exposure to solar energy.

11. In a solar collector, a method of transferring solar energy to air comprising the steps of:

passing the solar energy through a flat smooth diaphanous surface;

absorbing the solar energy in a black foam absorber having a plurality of adjoining grooves with ridges in close proximity to said diaphanous surface and with surfaces having numerous exposed air pockets said plurality of grooves being V or U shaped and having deeply cut sides diverging from the bottom of the groove to substantially increase the radiation absorptivity and the heat transfer surface area of said black absorber;

conveying substantially all the air in said solar collector in said plurality of grooves; and removing the air in said solar collector for use as an energy source.

12. The method according to claim 11 wherein the ridges of said plurality of grooves contact said diaphanous surface.

13. The method according to claim 11 wherein said plurality of grooves have a small included angle in order to maximize the ratio of the surface area of said black absorber to the surface area of said diaphanous surface.

14. The method according to claim 11 wherein said black foam absorber is a good insulator of low thermal capacity.

15. The method according to claim 11 further comprising the step of:

orienting said plurality of grooves to have a nearly uniform exposure to solar energy over most of the operating period of said solar collector.

16. The method according to claim 15 wherein said solar collector has an optimum tilt angle and an actual tilt angle, said plurality of grooves having a plane of symmetry through the bottom of said grooves which is perpendicular to the optimum tile angle of said solar collector but independent of the actual tilt angle of said solar collector.

* * * * *